Oct. 13, 1953 J. T. MARVIN 2,654,919
SEALING STRIP
Filed Oct. 11, 1951

INVENTOR.
John T. Marvin
BY
his Attorneys

Patented Oct. 13, 1953

2,654,919

UNITED STATES PATENT OFFICE 2,654,919

SEALING STRIP

John T. Marvin, Dayton, Ohio, assignor to General Motors Corporation, Detroit, Mich., a corporation of Delaware Application October 11, 1951, Serial No. 250,895

2 Claims. (Cl. 20—56.4)

1

This invention relates to sealing strips and is particularly concerned with sealing strips for use in connection with sheet-like parts to be joined and sealed.

The invention is therefore basically concerned with providing a sealing or connecting strip of elastomeric material which may be used as a means for connecting edge portions of two sheet-like parts to be joined and for simultaneously sealing the joint.

In carrying out this connection, a rigid garnish molding is provided to be used in connection with the sealing strip, which molding has a dual function of being ornamental and functional in that the molding acts as a wedging member for causing a sealing action between the strip and the edges of the parts to be joined.

Further, a sealing strip of elastomeric material is provided having a pair of opposed longitudinal grooves therein, which grooves are adapted to receive edge portions of parts to be joined, said strip also including a third longitudinal groove positioned between the other two grooves, which third groove is adapted to receive a garnish molding in interlocked relation thereto, which molding stretches the elastomeric material and forces the same into tight sealing relation with the parts to be joined.

To improve this assembly, the third groove is dimensioned so that the lateral extent thereof is greater than the lateral extent of the connecting portion between the two opposed grooves.

An additional improvement resides in the provision of a garnish molding which includes a rounded outer surface and two inwardly turned, doubly curved spring ears thereon of longitudinal extent whereby the garnish molding may be compressed laterally for insertion in the third groove whereupon the molding tends to spring outwardly for causing the elastomeric material of the strip to be stretched and deformed into tight sealing relation with the edges of the parts to be joined.

Another advance embodied in the invention is to provide a sealing strip which may be used in connection with automotive bodies and the like, which strip acts as a joining means between the body and the windshield or a rear window of the body wherein the strip not only joins the glass portion to the body but also seals the glass and the body against the elements while simultaneously providing an ornamental appearance at the exterior of the part through the inclusion of the functional ornamental molding therearound.

Further improvements will be apparent from the following description, reference being had to

2 the accompanying drawing, wherein preferred embodiments of the present invention are clearly shown.

Sealing or connecting strips are widely used, particularly in the automotive field, as a means for joining the edges of parts, wherein said joint is preferably a sealed joint. One of the most common usages of such connecting or sealing strips is in connection with automotive bodies wherein the windshield, rear window or the like is attached to the body through the medium of an elastomeric strip wherein a pane of glass is not only sealed against the elements but is carried in the strip to provide a shock absorbing mounting therefor. It is also apparent that this type of mounting is very economical and is easy to assemble initially as well as being easy to service when a new pane of glass is required. It is to be understood, however, that in some instances, two sheets of glass or two panes of glass are to be joined and in this respect, the invention is in no way limited to any specific sheet-like articles to be joined.

Figure 1:
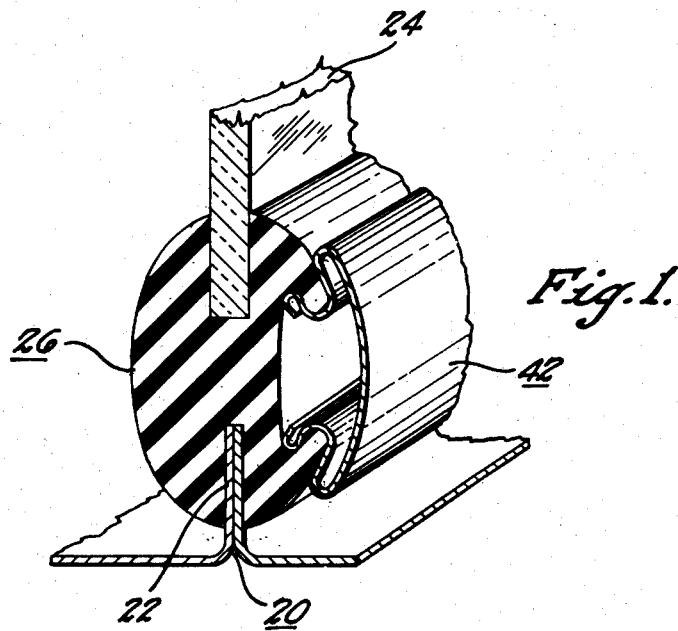
Fig. 1 shows a cross sectional view, in perspective, of a portion of a sealing strip with its garnish molding, interposed between a pinch-weld and a pane of glass.
Figure 2:
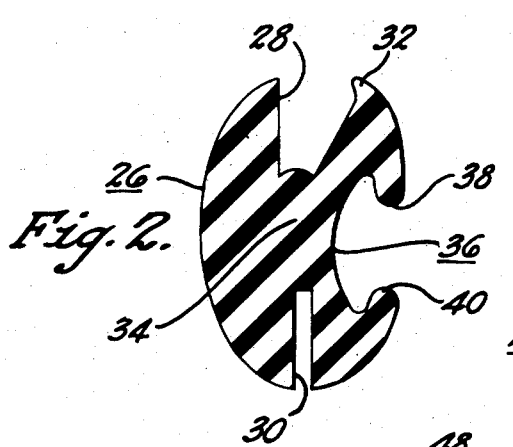
Fig. 2 is a cross sectional view of the sealing strip in the free position.

Referring particularly to Fig. 1, a conventional pinch-weld assembly is shown as used in connection with an automotive body. The pinch-weld 20 includes a longitudinally extending fin 22 thereon. A windshield or window 24 is shown and the fin 22 and the pane 24 are joined by a sealing strip 26. The sealing strip 26 includes two longitudinally extending opposed grooves 28 and 30 therein. The groove 28, as shown in Fig. 2, is formed in a normally open position wherein the top lateral dimension thereof is greater than the bottom lateral dimension. A longitudinal lip is preferably formed at 32 on the upper edge of the groove 28 to aid in sealing, although this is optional. The grooves 28 and 30 are connected by an intermediate longitudinal connecting portion 34. A third groove 36 is disposed between the grooves 28 and 30 at substantially 90° thereto. The grooves 36 include overhanging lip portions 38 and 40 which extend longitudinally of the strip 26 and which form a reduced width entrance to the groove 36. The groove 36, at its greatest lateral dimension, is preferably wider than the connection portion 34 between grooves 28 and 30. This is important in the function of the strip to obtain satisfactory sealing.

Figure 3:
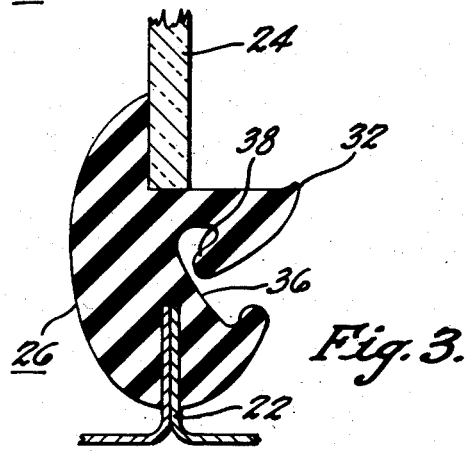
Fig. 3 is a cross sectional view of the sealing strip mounted on a pinch-weld showing the glass pane being inserted.
Figure 4:
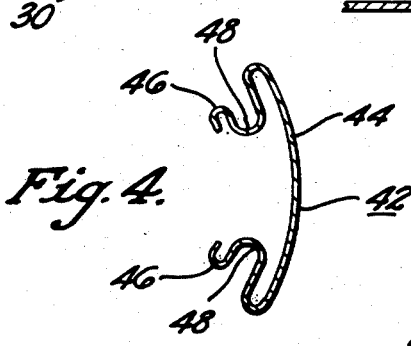
Fig. 4 is a cross sectional view of the spring-like garnish molding.

When using the strip 26, the groove 30 is positioned over the pinch-weld fin 22, as shown in Fig. 3, and the lip 32 of groove 28 is rotated in a clockwise direction so that lip 38 of groove 36 folds therein whereby the groove 28 is fully opened. In this position, the pane 24 may be easily inserted thereupon, the lip 32 is released and the portion of the strip controlled thereby flexes upwardly into more or less sealing relation with the pane 24. In order to assure a tight seal and a good connection between the pane 24 and the pinch-weld fin 22, a spreader is utilized which takes the form of a garnish molding 42, as shown in Fig. 4. This garnish molding has a curved ornamental outer surface 44 and two clips 46 which extend longitudinally of the molding 42 at the back thereof. The clips 46 are partially formed by deep channel portions 48 on either side of the molding, which channels 48 are adapted to receive the lips 38 and 40 and the groove 36. The distance between the troughs of the channels 48, however, is greater in lateral extent than the free distance between the lips 38 and 40 so that, when the molding 42 is forced into the groove 36 and the clips 46 snap over the lips 38 and 40, the groove 36 is actually stretched laterally and the strip 26 is deformed to cause the lip 32 to be forced into tight sealing relation with the pane 24. Simultaneously, the groove 30 is forced to a sealing position for the same reason. In order to assure a tight seal at all times, the molding 42 is made of a springy metallic material so that the lips 46 can be sprung inwardly toward one another for insertion in the sealing strip groove 36, whereupon the lips 46 spring outwardly and actually place constant spring pressure against the lips 38 and 40 of the sealing strip. In this position, the garnish molding 42 actually fully covers and overlaps the groove 36 for presenting an ornamental finish to the sealing strip, while simultaneously providing a spring-like action within the groove 36 to maintain the strip in tight sealing relation with the edges of the parts to be joined at all times. The particular lateral dimension of the groove 36 as compared to the connecting portion 34 and the lateral dimension of the longitudinal grooved portions 48 of the molding are all important to the success of the invention since it is imperative that the lip 32 be under pressure from the molding at all times in the assembly in order to provide a proper joint and seal. It will be noted that the sides of grooves 28 and 30, which are furthest away from groove 36, are quite strong and relatively rigid due to the added material therebetween.

It is understood that the material of the sealing strip may be of any suitable elastomeric material, such as, rubber, synthetic rubbers, such as, butadiene-styrene copolymers, butadiene-acrylonitrile copolymers, polychloroprene, compatible mixtures of the above materials, plastic compounds, such as, certain of the vinyls, etc., the only requirement being that the material is sufficiently springy and rubber-like so that it will be stretched or deformed by the insertion of the molding 42. Strips of this character may be made by molding or extrusion or any other satisfactory production method and may be compounded so as to provide any desired color to conform with the assembly in which the strip is to be used.

While the embodiments of the present invention as herein disclosed, constitute preferred forms, it is to be understod that other forms might be adopted.

What is claimed is as follows:

1. A sealing strip adapted to seal and join two sheet-like parts, comprising, an elastomeric strip of substantial length having a pair of opposed longitudinal grooves therein one of said grooves being normally open when the strip is in free position, including a connecting portion therebetween, said grooves being adapted to receive the edge portions of said parts, a third longitudinal groove in said strip positioned between said two other grooves and having a width greater than the lateral dimension of said connecting portion to form narrow, relatively flexible longitudinal connecting portions with each of said other two grooves, the edges of said third groove overhanging the groove longitudinally toward one another, and a thin transversely springy molding strip wider than said third groove and having lips with overturned curved edges and adapted to be positioned in said third groove, and interlocked therein so as to stretch the elastomeric material of said narrow, relatively flexible longitudinally extending portions so as to force the strip into tight sealing relation with said parts whereby said one groove is forced closed.

2. A sealing strip adapted to engage edge portions of parts to be joined in substantially sealed relation with one another, comprising, an elastomeric strip having a normally open longitudinal groove disposed therein, said groove having a greater lateral dimension at the open side thereof than at the bottom thereof, a second longitudinally disposed groove in said strip and positioned on the opposite side of the strip to said first groove, said grooves having a connecting portion of elastomeric material between the bottom portions thereof, a third groove disposed between said other two grooves and having a lateral dimension of greater extent than the width of said connecting portion, whereby said third groove extends upwardly into one side wall portion of each of said two other grooves to form narrow, relatively flexible longitudinally extending connecting portions, opposed overhanging lips running longitudinally of said third groove at the open side thereof for presenting a restricted opening to said groove, and a transversely springy longitudinally extending metallic garnish molding having a lateral dimension greater than the free distance between said lips the lips of said molding comprising overturned curved edges and adapted to be positioned within said third groove and interlocked between said groove lips whereby the elastomeric material of said strip is stretched at said narrow, relatively flexible longitudinally extending connecting portions so that the first mentioned groove is deformed so that the open side thereof is forced by the stretching action of said molding into sealing relation with one of the parts to be joined.

JOHN T. MARVIN.

References Cited in the file of this patent

UNITED STATES PATENTS

| Number | Name | Date |
|---|---|---|
| 1,961,352 | Hall | June 5, 1934 |
| 2,189,138 | Eichner | Feb. 6, 1940 |
| 2,257,951 | Haberstrump | Oct. 7, 1941 |
| 2,350,430 | Ulrich | June 6, 1944 |
| 2,556,775 | Oswald | June 12, 1951 |
| 2,607,966 | Beck | Aug. 26, 1952 |